(12) United States Patent
Feusse et al.

(10) Patent No.: US 9,169,885 B2
(45) Date of Patent: Oct. 27, 2015

(54) FACE TOOTH HYDRAULIC PISTON BRAKE

(71) Applicants: Warn Industries, Inc., Clackamas, OR (US); Parker-Hannifin Corporation, Cleveland, OH (US)

(72) Inventors: Craig Feusse, Fenton, MI (US); Roger Paul Gray, II, Greeneville, TN (US)

(73) Assignees: Parker-Hannifin Corporation, Cleveland, OH (US); Warn Industries, Inc., Clackamas, OR (US)

( * ) Notice: Subject to any disclaimer, the term of this patent is extended or adjusted under 35 U.S.C. 154(b) by 54 days.

(21) Appl. No.: 13/969,710

(22) Filed: Aug. 19, 2013

(65) Prior Publication Data

US 2013/0334868 A1  Dec. 19, 2013

Related U.S. Application Data

(62) Division of application No. 13/029,423, filed on Feb. 17, 2011, now Pat. No. 8,534,431.

(60) Provisional application No. 61/366,378, filed on Jul. 21, 2010.

(51) Int. Cl.
  *F16D 65/16* (2006.01)
  *F16D 59/02* (2006.01)
  (Continued)

(52) U.S. Cl.
  CPC .............. *F16D 59/02* (2013.01); *B60K 7/0015* (2013.01); *B60T 1/005* (2013.01); *B60T 7/12* (2013.01); *B60T 13/74* (2013.01); *B60T 17/02* (2013.01); *F16D 63/006* (2013.01); *F16D 65/16* (2013.01); *B60K 7/0007* (2013.01); *F16D 2121/06* (2013.01)

(58) Field of Classification Search
  CPC ....... F16D 59/02; F16D 63/006; B60T 1/005; B60T 7/12; B60T 7/122
  USPC .......... 188/31, 60, 72.7, 72.8, 72.9, 156, 157, 188/265
  See application file for complete search history.

(56) References Cited

U.S. PATENT DOCUMENTS 1,190,811 A * 7/1916 Swoyer et al. ................... 188/31
1,612,356 A * 12/1926 Bregoz .......................... 188/72.8
(Continued)

FOREIGN PATENT DOCUMENTS

WO           81/02614 A1    9/1981

OTHER PUBLICATIONS

SprinkFLEX—Flexible Sprinkler Hose Fittings; SprinkFLEX LLC, Boston, MA; www.sprinkflex.com; (one page).

*Primary Examiner* — Thomas J Williams
(74) *Attorney, Agent, or Firm* — Alleman Hall McCoy Russell & Tuttle LLP

(57) ABSTRACT

A braking mechanism is provided for a hydraulic motor driven wheel utilizing a two-piece design of a hub that rotates by means of a drive shaft. A hydraulic chamber is created on the hub in which a piston resides. The piston is grounded (i.e., non-rotatable relative to the motor housing) in the sealed chamber. The piston face inside of the chamber has a radial set of face teeth. These face teeth are similar to the face teeth inside of the hydraulic chamber. When the chamber is pressurized, the piston face teeth are pushed away from the hub face teeth allowing the hub to freely rotate. When pressure is released from the chamber, a spring, or a number of springs, push the piston into the hub causing it to stop rotating relative to the piston.

12 Claims, 18 Drawing Sheets

(51) Int. Cl.
  *B60T 13/74* (2006.01)
  *B60T 17/02* (2006.01)
  *F16D 63/00* (2006.01)
  *B60T 1/00* (2006.01)
  *B60T 7/12* (2006.01)
  *B60K 7/00* (2006.01)
  *F16D 121/06* (2012.01)

(56) References Cited

U.S. PATENT DOCUMENTS

| | | | |
|---|---|---|---|
| 2,009,862 A * | 7/1935 | Spell | 188/31 |
| 2,996,154 A * | 8/1961 | Vial | 188/31 |
| 3,500,970 A | 3/1970 | Schilling | |
| 3,608,679 A | 9/1971 | Harrison | |
| 3,726,801 A | 4/1973 | Sterner et al. | |
| 3,800,901 A | 4/1974 | Blomstrom et al. | |
| 3,827,528 A | 8/1974 | Shaffer | |
| 4,102,444 A | 7/1978 | Palme | |
| 4,244,276 A | 1/1981 | Iwata | |
| 4,245,724 A | 1/1981 | Beck | |
| 4,291,779 A | 9/1981 | Mann et al. | |
| 4,464,898 A | 8/1984 | Aoyagi et al. | |
| 4,493,404 A | 1/1985 | Wenker | |
| 4,557,109 A | 12/1985 | Nagahara et al. | |
| 4,583,425 A | 4/1986 | Mann et al. | |
| 4,642,985 A | 2/1987 | Nozawa et al. | |
| 4,690,252 A * | 9/1987 | Kottke et al. | 188/265 |
| 4,899,541 A | 2/1990 | Okada et al. | |
| 5,154,261 A | 10/1992 | Tanaka et al. | |
| 5,167,291 A | 12/1992 | Mann | |
| 5,333,705 A | 8/1994 | Lemaire et al. | |
| 5,398,776 A | 3/1995 | Forster | |
| 5,431,245 A | 7/1995 | Beck et al. | |
| 5,586,630 A | 12/1996 | Orzal | |
| 5,680,915 A | 10/1997 | Sommer | |
| 5,755,060 A * | 5/1998 | Zweili | 49/449 |
| 5,855,115 A | 1/1999 | Martin | |
| 6,050,091 A | 4/2000 | Maruta | |
| 6,090,006 A | 7/2000 | Kingston | |
| 6,135,259 A | 10/2000 | Forster | |
| 6,142,266 A | 11/2000 | Appeldorn et al. | |
| 6,186,262 B1 | 2/2001 | Mann et al. | |
| 6,199,377 B1 | 3/2001 | Allart et al. | |
| 6,248,037 B1 | 6/2001 | Forster | |
| 6,260,653 B1 | 7/2001 | Forster | |
| 6,293,100 B1 | 9/2001 | Allart et al. | |
| 6,301,884 B1 | 10/2001 | Hauser et al. | |
| 6,443,290 B1 | 9/2002 | Forster | |
| 6,484,497 B1 | 11/2002 | Jolliff et al. | |
| 6,543,222 B1 | 4/2003 | Case et al. | |
| 6,543,587 B1 | 4/2003 | Albrecht | |
| 6,564,549 B2 | 5/2003 | Nagura et al. | |
| 6,598,694 B2 | 7/2003 | Forster | |
| 6,648,091 B2 | 11/2003 | Tanabe | |
| 6,681,903 B2 | 1/2004 | Tar et al. | |
| 6,743,002 B1 | 6/2004 | Millar et al. | |
| 6,904,993 B1 | 6/2005 | Rinck et al. | |
| 6,907,962 B2 | 6/2005 | Forster | |
| 6,926,372 B2 | 8/2005 | Bigo et al. | |
| 7,431,124 B2 | 10/2008 | White, Jr. | |
| 7,431,133 B2 | 10/2008 | Maron et al. | |
| 7,992,346 B2 * | 8/2011 | Finke | 188/31 |
| 8,534,431 B2 * | 9/2013 | Feusse et al. | 188/170 |
| 2005/0178638 A1* | 8/2005 | Kramer et al. | 188/31 |
| 2007/0180772 A1* | 8/2007 | Finke | 49/280 |
| 2010/0102288 A1 | 4/2010 | Yang et al. | |
| 2010/0127228 A1 | 5/2010 | Xie et al. | |
| 2010/0163815 A1 | 7/2010 | Cao et al. | |

* cited by examiner

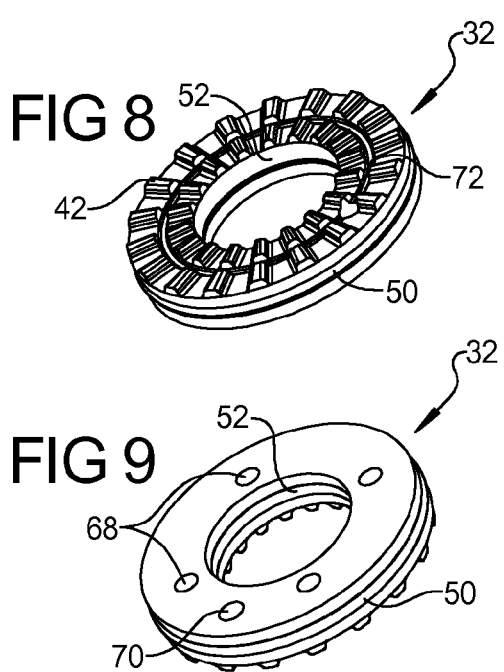
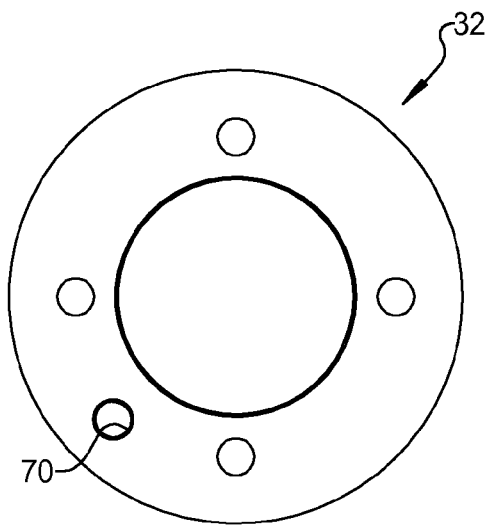
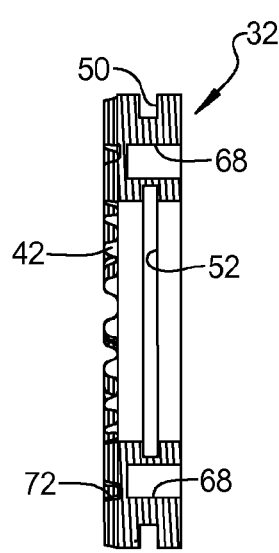
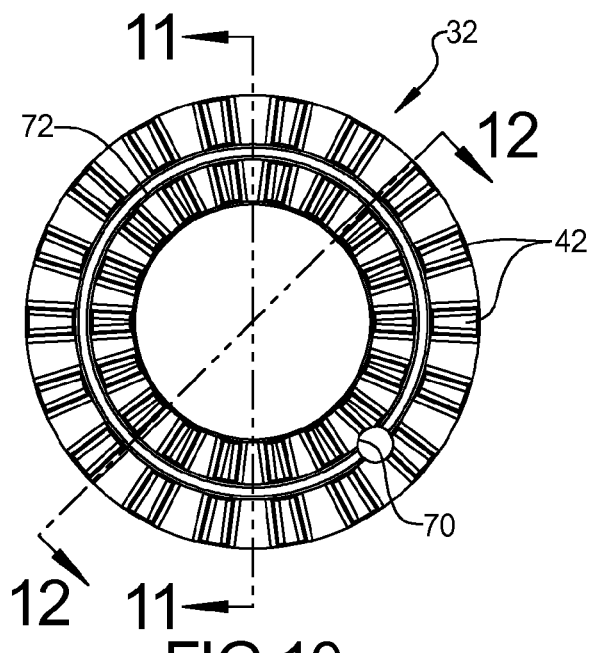
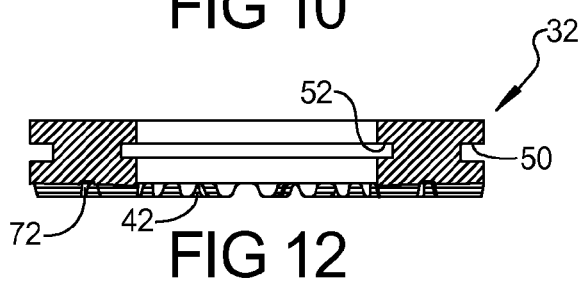

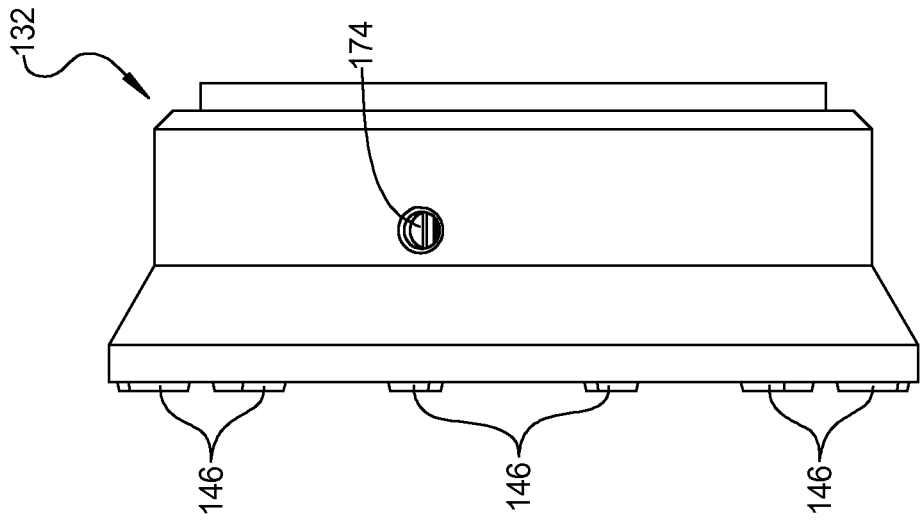
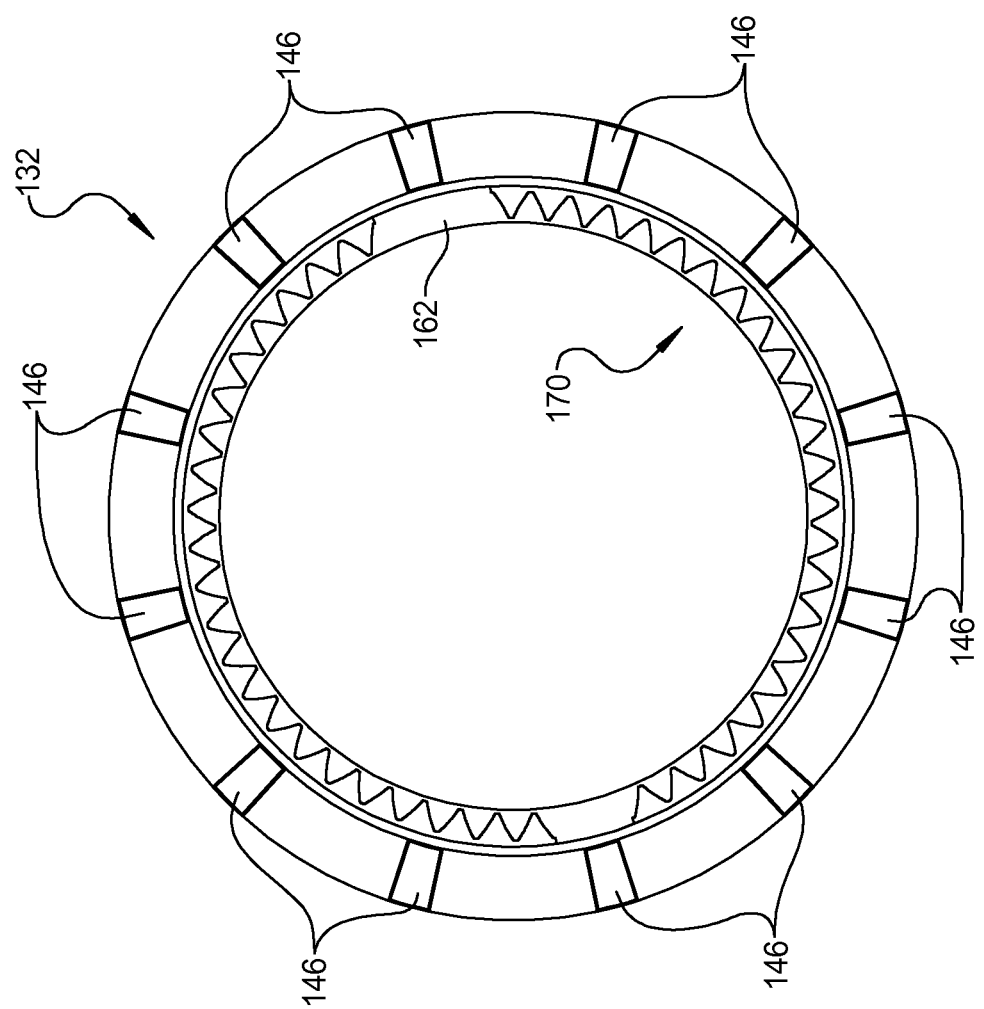

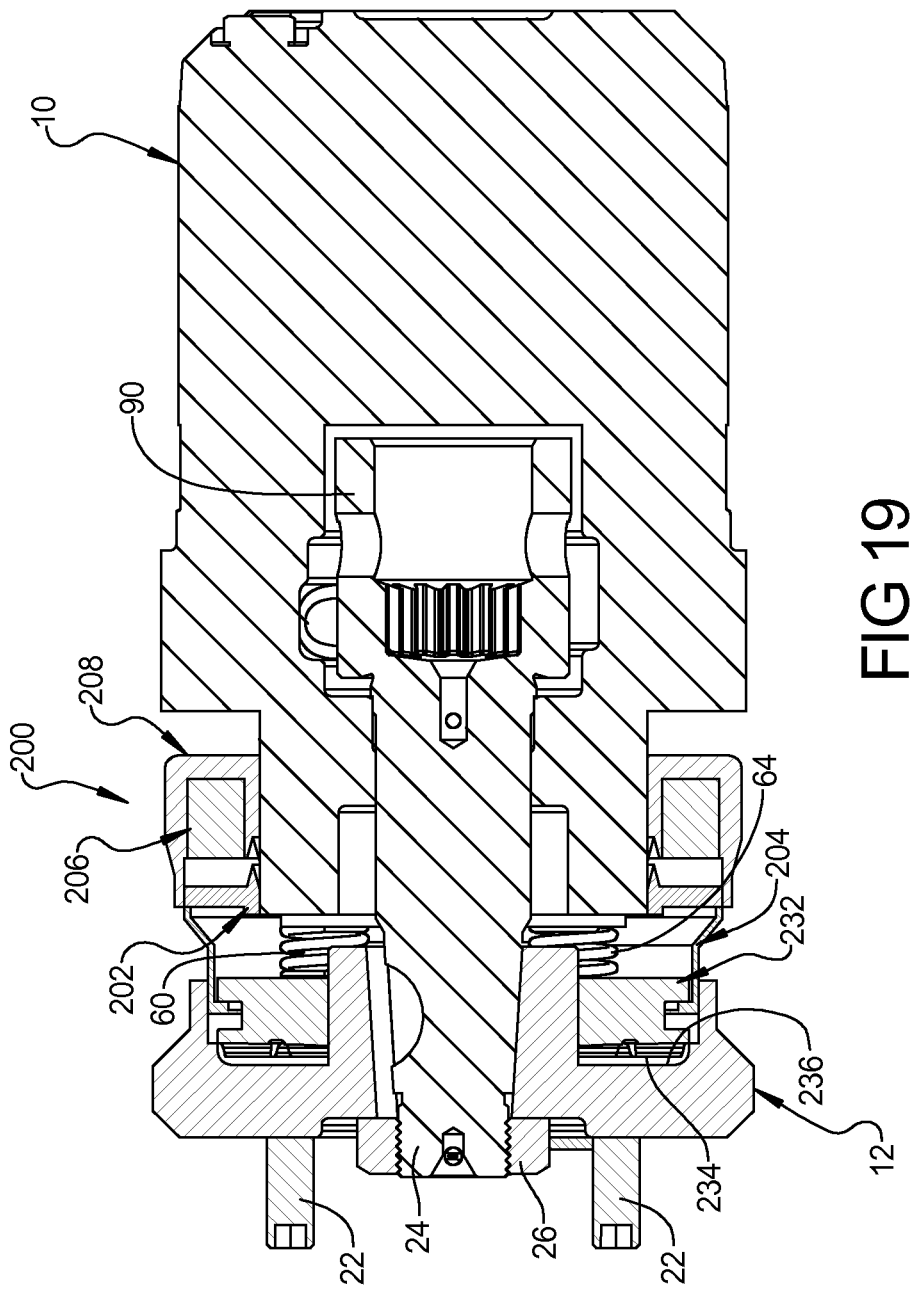

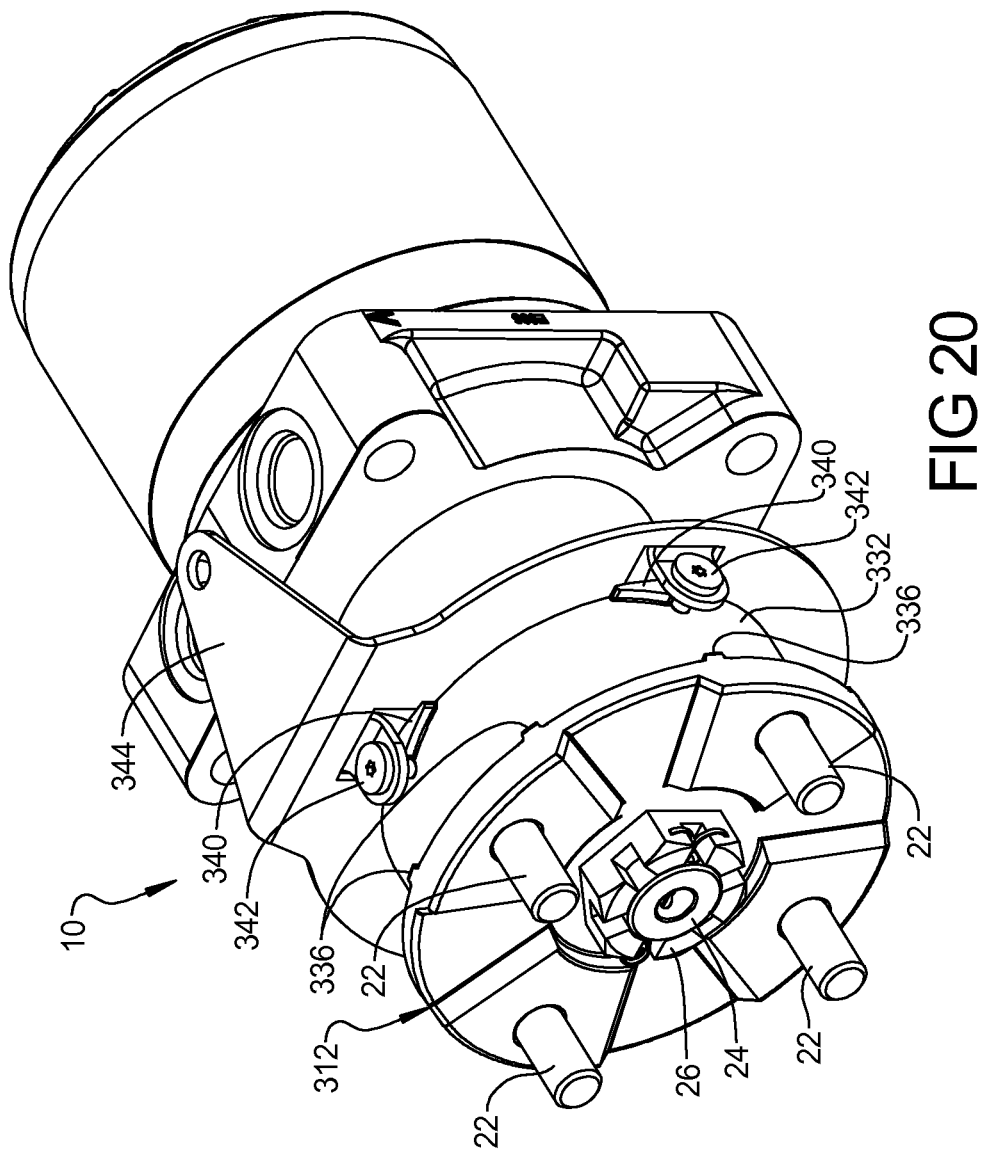

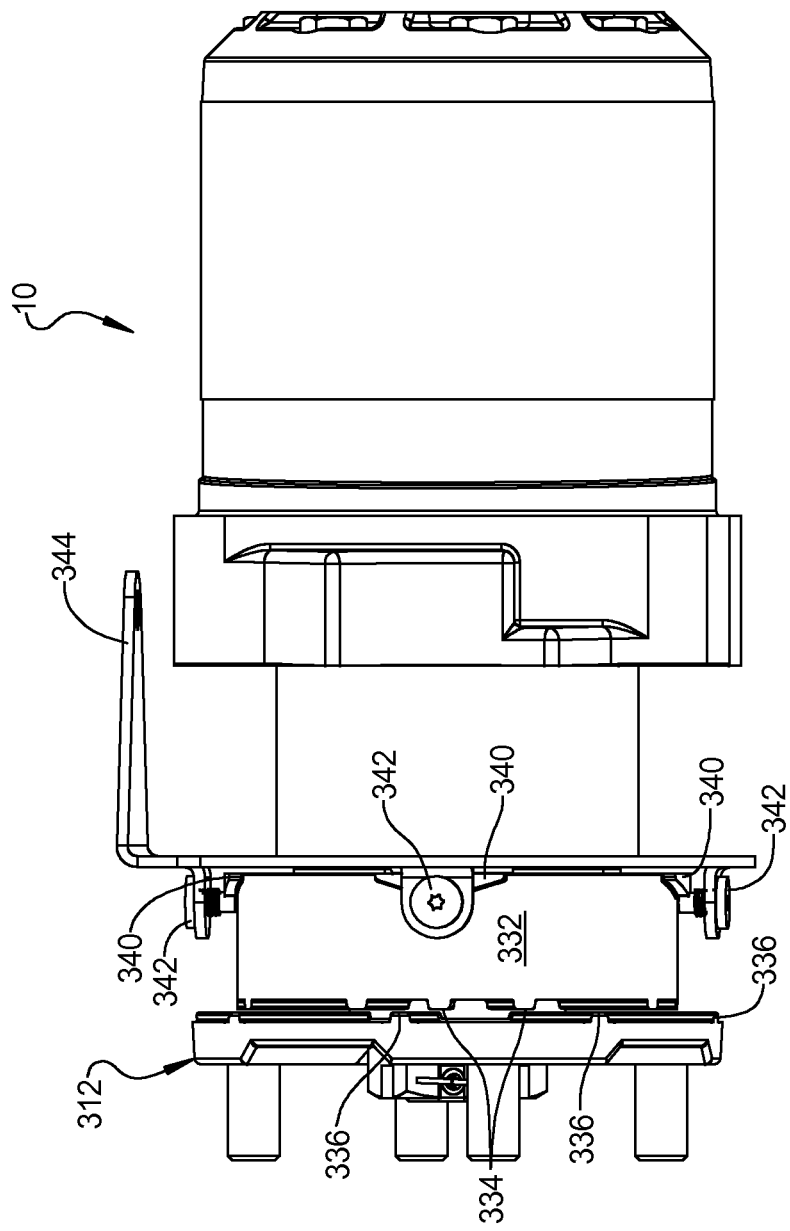

FACE TOOTH HYDRAULIC PISTON BRAKE

CROSS-REFERENCE TO RELATED APPLICATIONS

This application is a divisional of U.S. application Ser. No. 13/029,423, filed Feb. 17, 2011, which claims the benefit of U.S. Provisional Application No. 61/366,378, filed on Jul. 21, 2010, the disclosures of which are incorporated herein by reference.

FIELD

The present disclosure relates to brakes for mechanical devices, and more particularly, to a face tooth piston brake.

BACKGROUND

This section provides background information related to the present disclosure which is not necessarily prior art.

Many types of devices require safety brakes that are automatically engaged upon de-actuation of the device and disengaged upon activation of the device. Exemplary technologies that can benefit from this type of device include lawn mowers, all-terrain vehicles, maintenance vehicles, winches, hoists, lifts, as well as other types of recreational and industrial machinery.

SUMMARY

This section provides a general summary of the disclosure, and is not a comprehensive disclosure of its full scope or all of its features.

According to the principles of the present disclosure, a brake assembly is provided including a drive member rotatable about an axis. A hub is attached to the drive member with the hub defining a piston chamber therein. A surface of the piston chamber includes a first plurality of face teeth. A piston is non-rotatably disposed within the piston chamber and has a second plurality of face teeth that, in a braking mode, engage the first plurality of teeth. A spring biases the piston axially toward the surface of the piston chamber for causing engagement of the first and second plurality of face teeth. A hydraulic chamber is defined between the piston and the piston chamber to allow the chamber to be supplied with hydraulic fluid for disengaging the face teeth to allow rotation of the hub along with the drive member. Alternative actuation devices can be provided for disengaging the face teeth to allow the drive member to drive the hub. Exemplary actuating devices can include a pneumatic system, a mechanical system, or an electro-mechanical system that can be operated to disengage the safety brake.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 is a perspective view of the piston having face teeth thereon according to the principles of the present disclosure;

FIG. 9 is a rear perspective view of the piston shown in FIG. 8;

FIG. 10 is a top plan view of the piston shown in FIG. 8;

FIG. 11 is a cross-sectional view taken along line 11-11 of FIG. 10;

FIG. 12 is a cross-sectional view taken along line 12-12 of FIG. 10;

FIG. 13 is a rear plan view of the piston shown in FIG. 8;

FIG. 15A is a front plan view and FIG. 15B is a side plan view of the piston of FIG. 14 having face teeth thereon according to the principles of the present disclosure;

FIG. 19 is a cross-sectional view of a hydraulic motor and wheel hub parking brake system incorporating an electro-mechanical actuation device for disengaging the brake;

FIG. 20 is a perspective view of a hydraulic motor and wheel hub arrangement incorporating a parking brake, according to the principles of the present disclosure;

FIG. 21 is a side plan view of the hydraulic motor and wheel hub parking brake system shown in FIG. 20;

Corresponding reference numerals indicate corresponding parts throughout the several views of the drawings.

DETAILED DESCRIPTION

Figure 1:
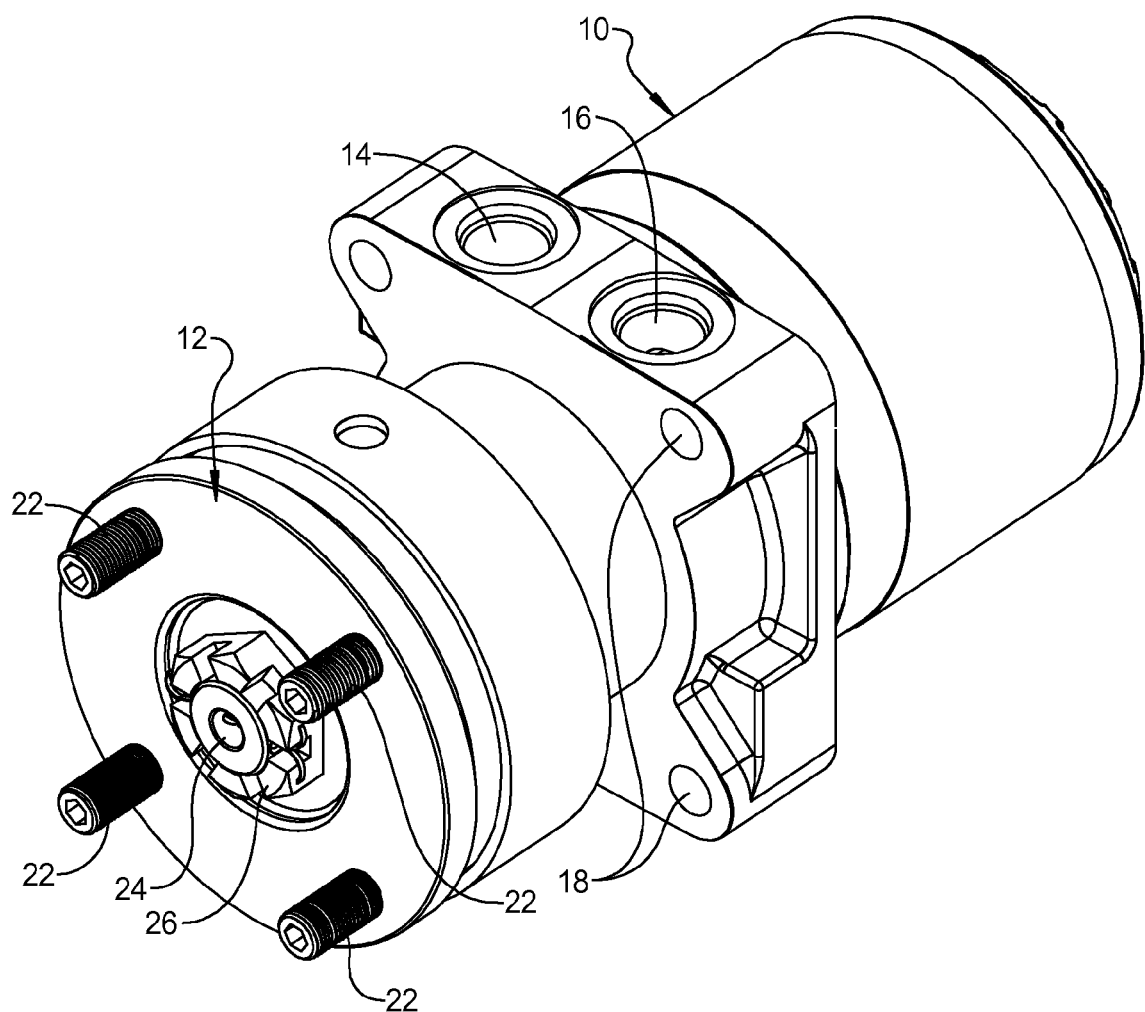
FIG. 1 is a perspective view of a hydraulic motor and wheel hub arrangement incorporating a parking brake, according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
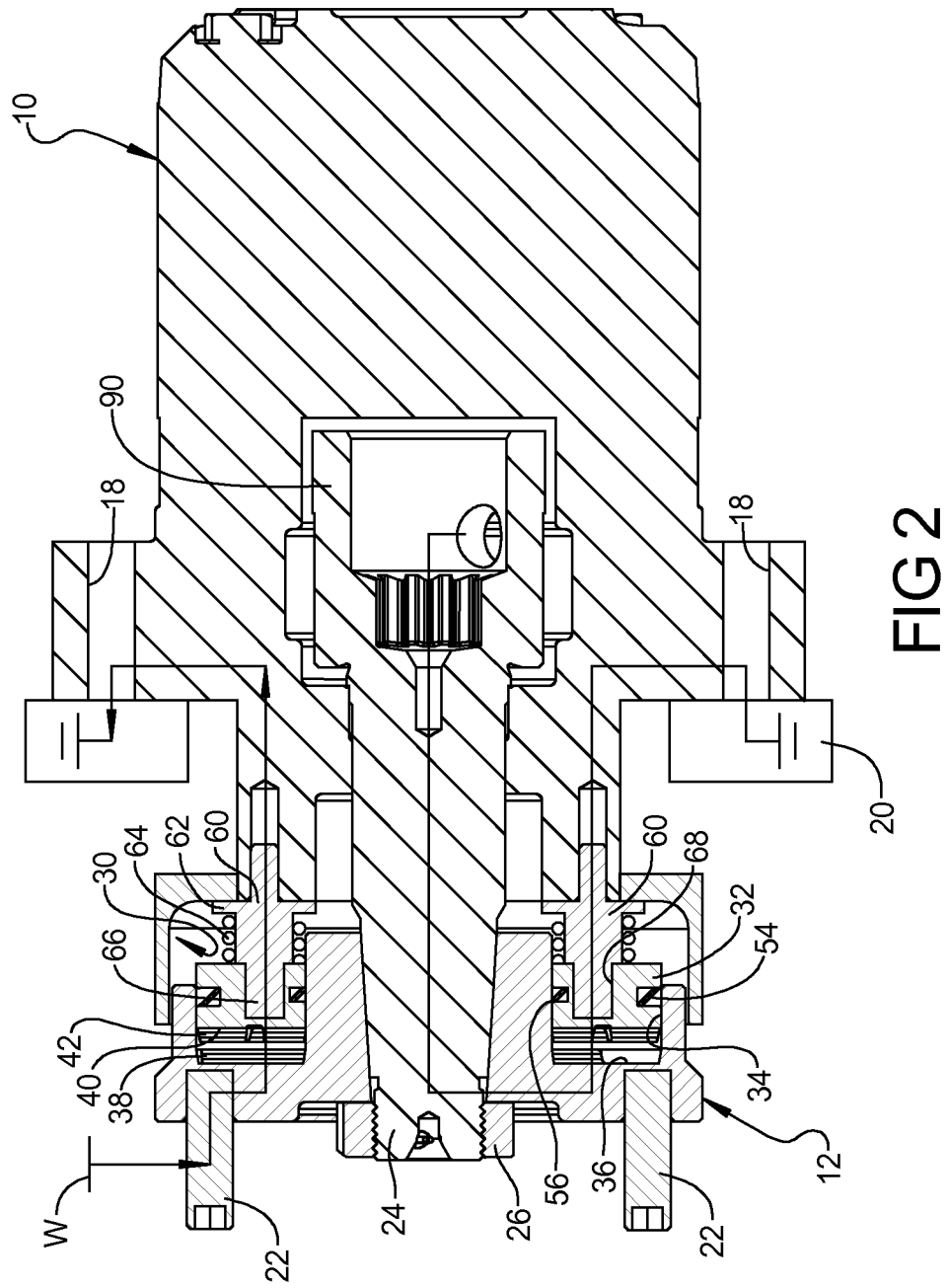
FIG. 2 is a cross-sectional view of the hydraulic motor and wheel hub parking brake system shown in FIG. 1.

With reference to FIG. 1, a hydraulic motor 10 is shown for driving a hub 12 of a hydraulic controlled vehicle. The hydraulic motor 10 includes fluid ports 14, 16 that control the operation of the hydraulic motor to provide forward or reverse rotation thereof. Mounting apertures 18 are provided on the hydraulic motor for mounting the hydraulic motor to a frame structure 20 of a vehicle as is schematically illustrated in FIG. 2. The hub 12 can include a plurality of wheel lugs 22 which allow for mounting of a wheel W (schematically illustrated in FIG. 2) thereon. The hydraulic motor 10 includes a drive shaft 24 which extends through the hub 12 and is secured thereto by a nut 26.

Figure 7:
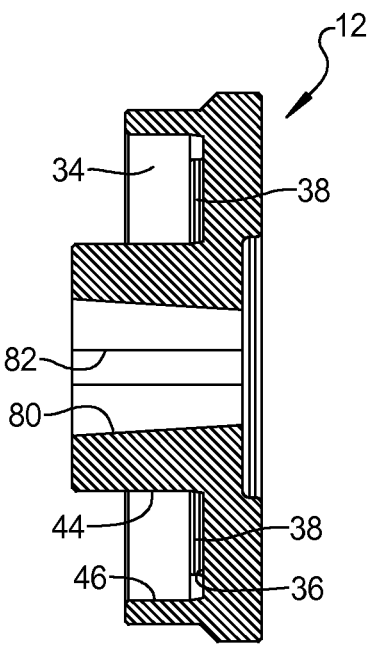
FIG. 7 is a cross-sectional view taken along line 7-7 of FIG. 6.

With reference to FIG. 2, a cross-sectional view of the hydraulic motor and hub 12 are shown with details of a brake mechanism 30 shown therein. The brake mechanism 30 utilizes a piston 32 disposed within a piston cavity 34 of the hub 12. The piston cavity 34 defines an axially facing surface 36 having a plurality of face teeth 38 thereon. The piston 32 includes a second axially facing surface 40 including a plurality of face teeth 42 disposed thereon for mating engagement with the face teeth 38 disposed within the piston cavity 34. The piston cavity 34, as best shown in FIG. 7, also includes an inner cavity wall 44 and an outer cavity wall 46 with the axially facing surface 36 extending therebetween.

Figure 3:
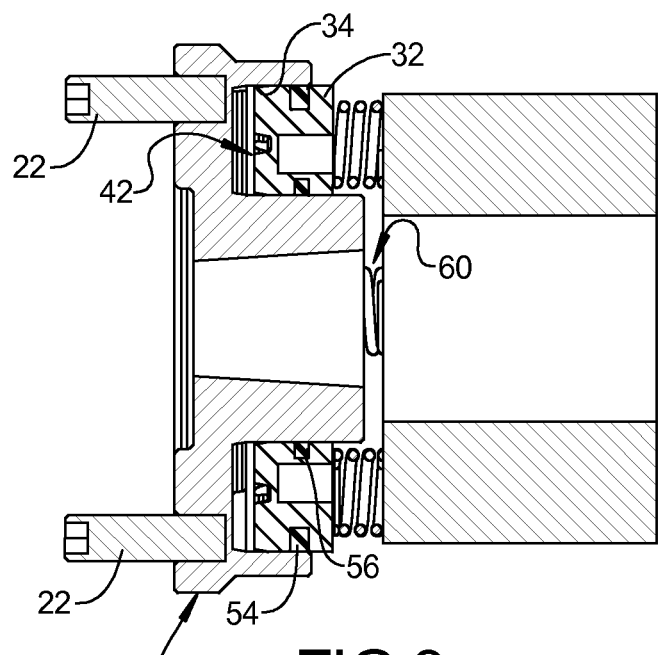
FIG. 3 is a cross-sectional view illustrating the components of the parking brake assembly according to the principles of the present disclosure.
Figure 4:
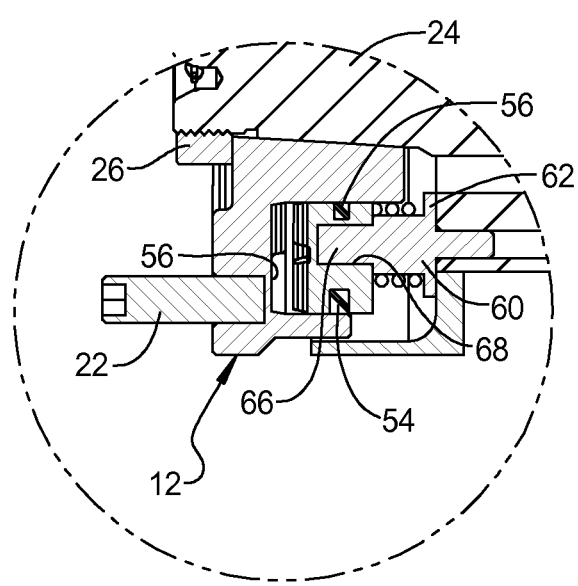
FIG. 4 is a further detailed cross-sectional view of the components of the park brake assembly according to the principles of the present disclosure.

The piston 32, as best shown in FIG. 11, includes an outer seal groove 50 and an inner seal groove 52 which receive an outer seal ring 54 and an inner seal ring 56, respectively, that provides sealing engagement with the outer cavity wall 46 and inner cavity wall 44 of the piston cavity 34, as shown in FIGS. 2-4.

The piston 32 is supported for axial movement within the piston cavity 34 by a plurality of guide pins 60 which are secured to the housing of the hydraulic motor. The guide pins 60 can be threadedly engaged with the hydraulic motor, or otherwise attached thereto either directly or indirectly. The guide pins 60 further include a spring seat portion 62 against which a coil spring 64 can be seated. The coil spring 64 is disposed between the seat portion 62 and the piston 32. The guide pins 60 further include a post portion 66 which is received in a corresponding guide hole 68 provided in a rear surface of the piston 32. The piston 32 is biased by the springs 64 in an axial direction so that the face teeth 42 of the piston 32 are engaged with the face teeth 38 within the piston cavity 34 of the hub 12.

As best shown in FIGS. 8-13, the piston 32 is provided with a fluid passage 70 and a fluid channel 72 which bisects the face teeth 42 whereby the fluid passage 70 is provided with hydraulic fluid that extends through the fluid passage 70 and into the fluid channel 72 creating a hydraulic pressure that axially opposes the biasing force of the springs 64 to move the piston 32 axially away from the face teeth 38 within the piston cavity 34. By disengaging the face teeth 42 of the piston 32 from the face teeth 38 within the hub 12, the hub 12 is free to rotate along with the drive shaft 24.

Figure 5:
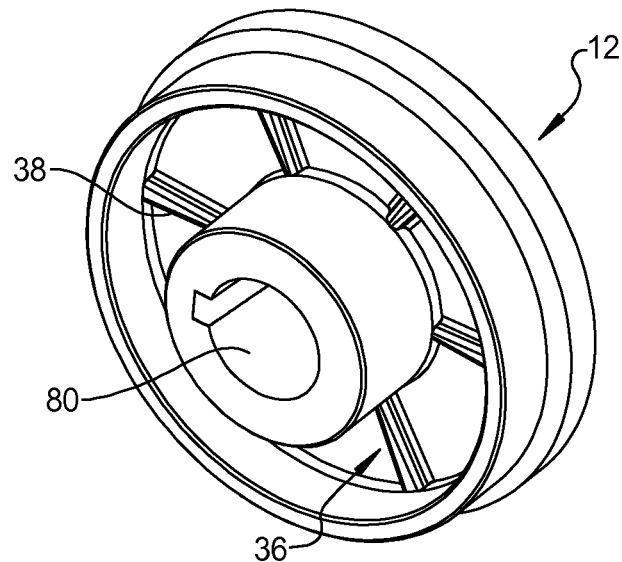
FIG. 5 is a perspective view of the hub having face teeth thereon according to the principles of the present disclosure.
Figure 6:
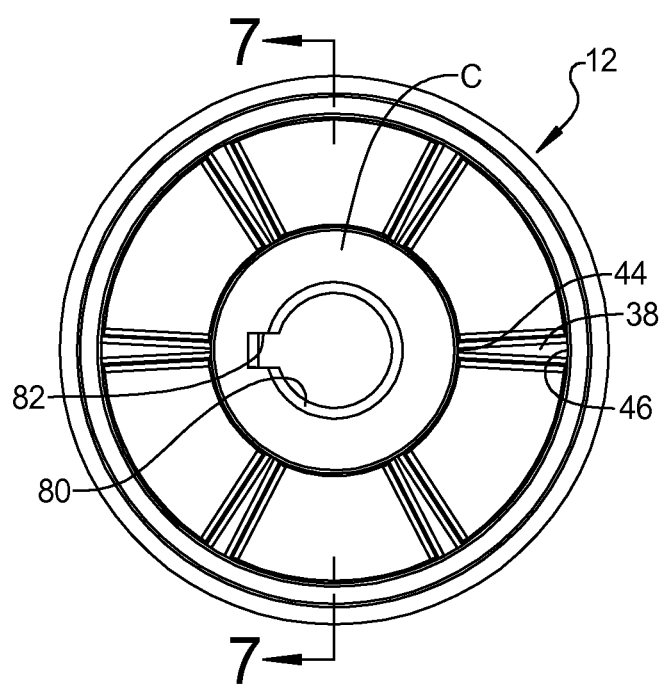
FIG. 6 is a plan view of the hub shown in FIG. 5.

It is noted that the hub 12 includes a tapered aperture 80, as best shown in FIGS. 5-7. The tapered aperture 80 receives the drive shaft 24 therein while the nut 26 secures the hub 12 onto the shaft 24. The hub 12 can include a keyway 82 communicating with the tapered aperture 80 to provide a keyed connection with the drive shaft 24. The drive shaft 24 can include a rotor 90 which is received in the housing of the hydraulic motor 10 which upon supply of hydraulic fluid in a controlled manner to the hydraulic motor, causes the rotor 90 to rotate, thereby causing the drive shaft 24 and hub 12 to rotate as well.

The hydraulic fluid can also be supplied to the fluid passage 70 within the piston 32 so as to disengage the safety brake when the hydraulic motor is being operated. When the hydraulic motor 10 is no longer being operated, the supply of hydraulic fluid for disengaging the safety brake is removed, and the safety brake automatically re-engages to prevent rotation of the hub 12 and thereby the wheel mounted thereto.

The present disclosure provides a braking mechanism for a hydraulic motor driven wheel utilizing a two-piece design of a hub that rotates by means of a drive shaft 24. A hydraulic chamber is created within the hub 12 in which the piston 32 resides. The piston 32 is grounded (i.e., non-rotatable relative to the motor housing) in the sealed chamber. The piston face inside of the chamber has a radial set of face teeth. These face teeth are similar to the face teeth inside of the hydraulic chamber. When the chamber is pressurized, the piston face teeth are pushed away from the hub face teeth allowing the hub to freely rotate. When pressure is released from the chamber, a spring, or a number of springs, push the piston into the hub causing it to stop rotating relative to the piston. It is noted that a pneumatic actuation system can be operated in the same manner as the described hydraulic actuation system.

Figure 14:
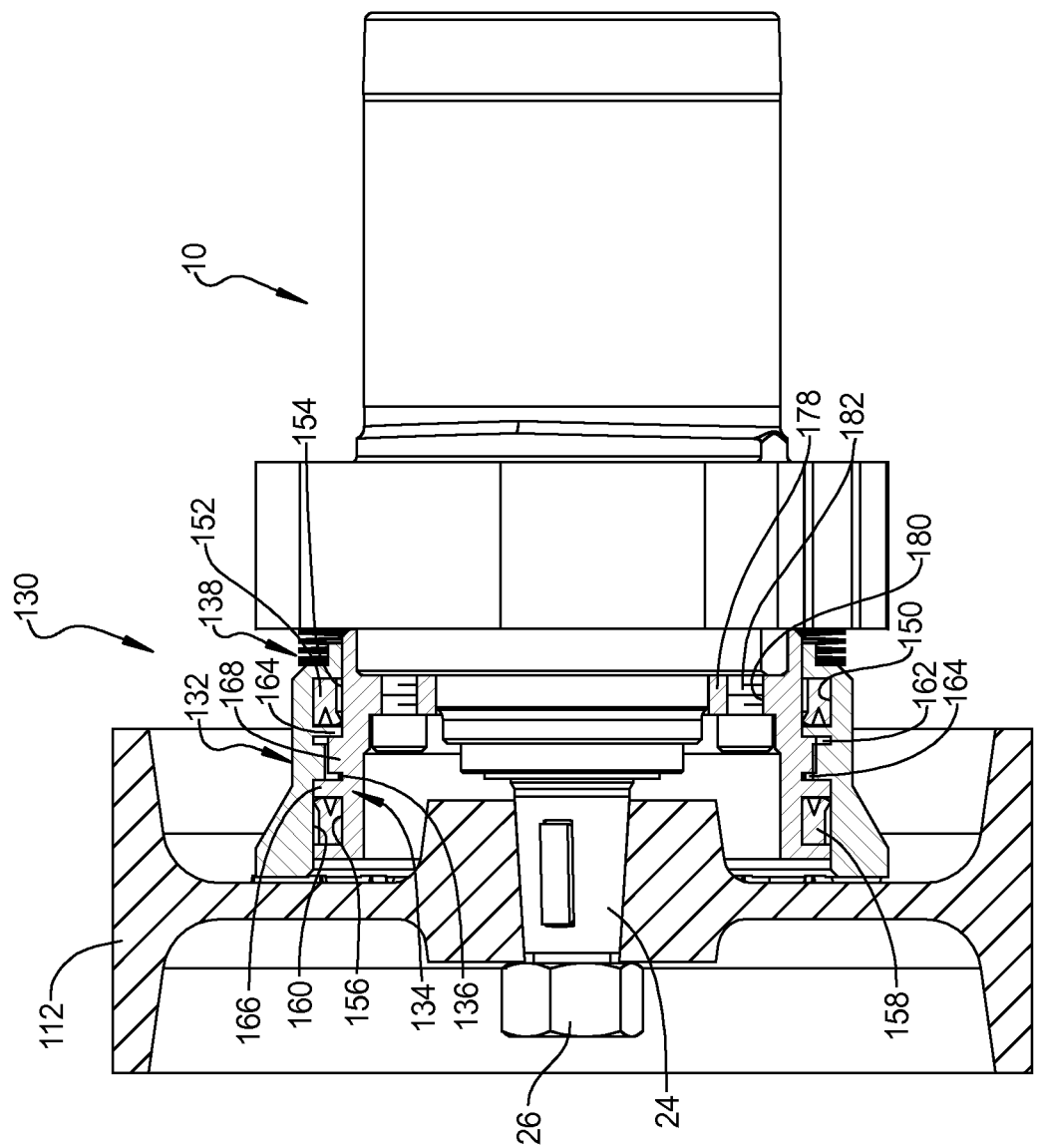
FIG. 14 is a cross-sectional view of a hydraulic motor and hub brake system according to an alternative embodiment.

With reference to FIG. 14, an alternative hydraulic piston brake arrangement is shown for use with a hydraulic motor 10 for driving a hub 112. The hydraulic motor 10 can include fluid ports (similar to ports 16, 18 shown in FIG. 1) that control the operation of the hydraulic motor to provide forward or reverse rotation thereof. The motor can also be provided with mounting apertures (similar to apertures 18 shown in FIG. 1) for mounting the hydraulic motor 10 to a frame structure of a vehicle or other machinery as is desired. The hub 112 can include wheel lugs for use on a hydraulic controlled vehicle, or alternatively, it can be used in other machinery for operating a hydraulically operated device. The hydraulic motor includes a drive shaft 24 which extends through the hub 112, and is secured thereto by a nut 26. The hydraulic motor 10 and hub 112 include a brake mechanism 130 shown therein. The brake mechanism 130 utilizes an annular piston 132 disposed against an annular backing plate 134 that is securely mounted to the motor housing. The backing plate 134 and piston 132 define a hydraulic chamber 136 radially therebetween that is supplied with hydraulic fluid for moving the piston 132 to a disengaged position against the biasing force of springs 138.

Figure 16:
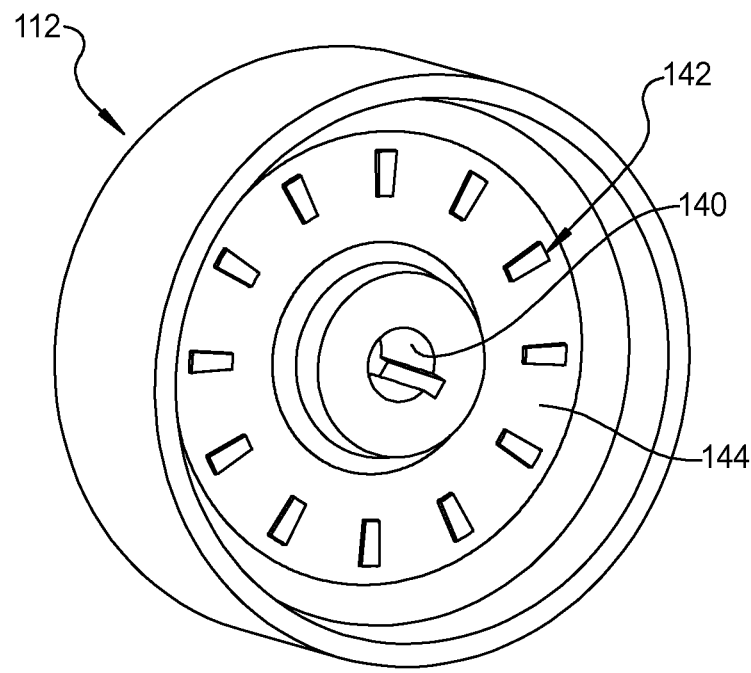
FIG. 16 is a perspective view of the hub of FIG. 14 having face teeth thereon according to the principles of the present disclosure.

As best shown in FIG. 16, the hub 112 includes a center aperture 140 that receives the drive shaft 24 of the motor 10 therein. The nut 26 secures the hub 112 to the drive shaft 24. The hub 112 further includes a plurality of brake teeth 142 on an axially facing surface 144.

The piston 132, as best shown in FIGS. 15A and 15B, includes a plurality of brake teeth 146 which are engageable with the brake teeth 142 of the hub 112. The brake teeth 146 are disposed on an axial end face of the annular piston 132. As shown in the cross-sectional view of FIG. 14, the piston 132 includes a seal cavity 150 therein for receiving a seal 152 that is disposed on one side of the hydraulic chamber 136 for engagement with the outer surface 154 of the backing plate 134. The backing plate 134 includes a second seal cavity 156 for receiving a second seal 158 for sealing against an interior surface 160 of the piston 132 on an opposite end of the hydraulic chamber 136. The hydraulic chamber 136 includes a first end face in the form of an annular flange 162 extending radially inward from the piston 132. A second end face 164 of the hydraulic chamber 136 is disposed on a radially outwardly extending flange 166 of the backing plate 134.

The backing plate 134 includes a plurality of radially outwardly extending splines 168 which mate with corresponding inwardly extending splines 170 on the interior surface of the piston 132. The splines 168, 170 allow axial movement of the piston 132 relative to the backing plate 134 in response to pressurization of the hydraulic chamber 136 while preventing relative rotation of the piston 132 relative to the backing plate 134 which is fixedly attached to the motor housing.

As shown in FIG. 15B, the piston 132 is provided with a hydraulic port 174 which receives pressurized hydraulic fluid therein for moving the piston 132 axially relative to the backing plate 134 against the biasing force of the springs 138 in order to disengage the brake teeth 146 of the piston 132 from the brake teeth 142 of the hub 112. When the hydraulic pressure is released, the springs 138 bias the piston 132 back to an engaged position so that there is a brake tooth interface between the brake teeth 146 of the piston 132 and the brake teeth 142 of hub 112.

When the motor 10 is supplied with hydraulic fluid for driving the motor, the hydraulic fluid is also supplied to the hydraulic port 174 to disengage the hydraulic brake to allow the motor 10 to drive the hub 112. When the hydraulic fluid to the motor 10 is interrupted, the hydraulic fluid that disengages the brake is also halted so that the brake is re-engaged automatically when the motor is not driven. As shown in FIG. 14, the backing plate 134 can be provided with an annular flange 178 including a plurality of apertures 180 for receiving mounting bolts 182 therein for mounting the backing plate to the motor housing. With the brake arrangement of the embodiment shown in FIGS. 14-16, the seals 152 and 158 are provided in a non-rotating environment between the non-rotating backing plate 134 and piston 132, and therefore provide a sealed hydraulic chamber 136 capable of withstanding high pressures for use in various types of applications. The ability to withstand high pressures within the hydraulic chamber 136 allows the use of biasing springs 138 having a high spring rate for providing a strong brake connection.

Figure 18:
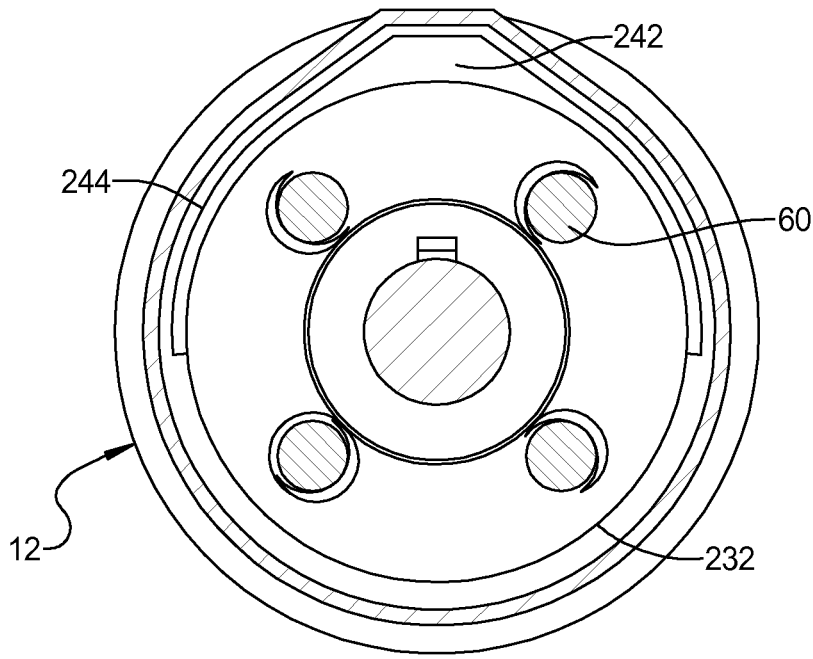
FIG. 18 is a cross-sectional view illustrating the components of the mechanical actuation device of FIG. 17.
Figure 17:
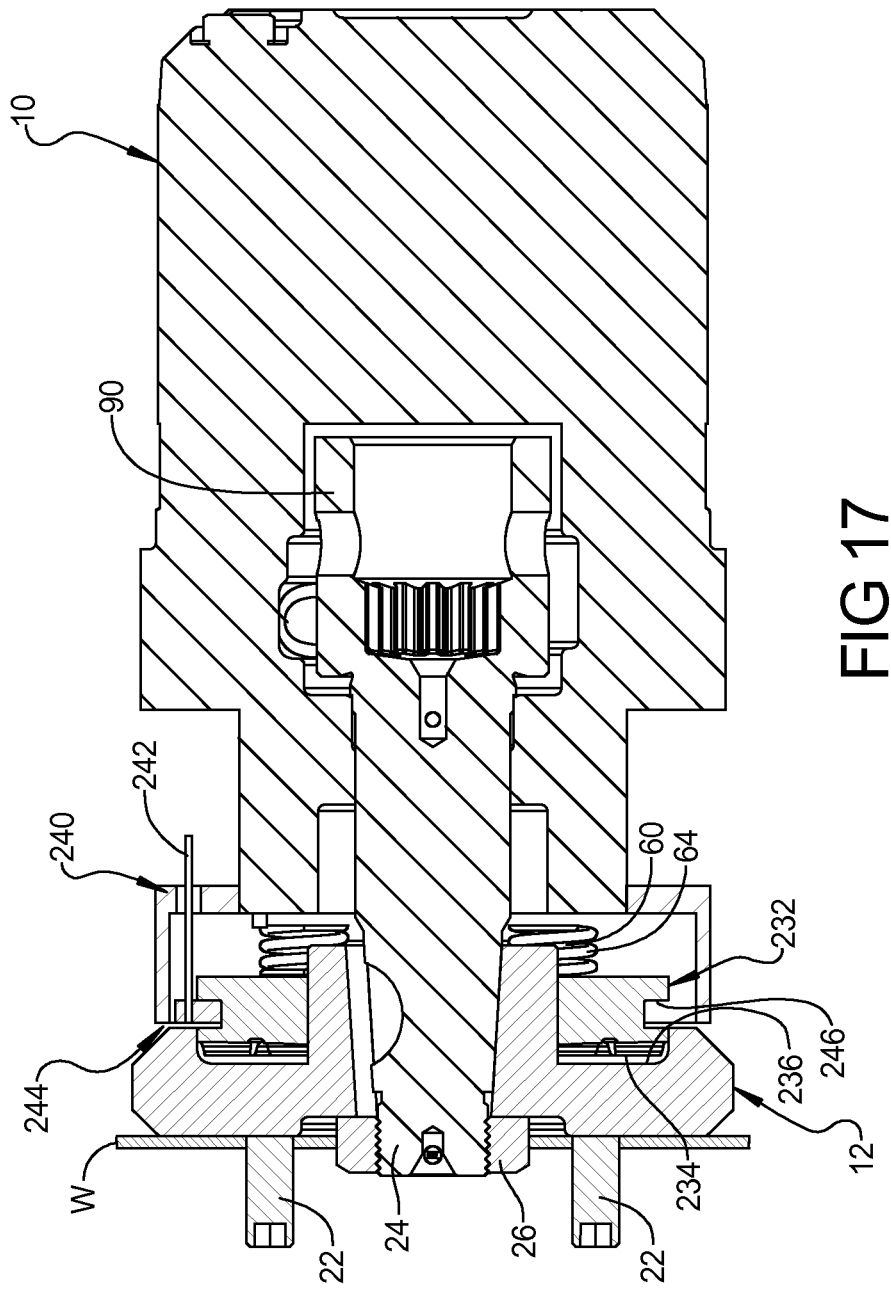
FIG. 17 is a cross-sectional view of a hydraulic motor and wheel hub parking brake system incorporating a mechanical actuation device for disengaging the brake.

With reference to FIGS. 17 and 18, a motor and piston brake assembly is shown in which a mechanical actuator is utilized for disengaging the piston brake. In particular, as shown in FIG. 17, a motor 10 includes a drive shaft 24 which is connected to a hub 12 in the same manner as previously described. A piston 232 is provided with face teeth 234 which engage corresponding face teeth 236 on the hub 12. A plurality of guide pins 60 engage and guide the piston 232 while a plurality of springs 64 bias the piston 232 into engagement with the face teeth of the hub 12. A mechanical actuator 240 includes a pull cable 242 that engages a shift fork 244 that is received in an annular groove 246 of the piston 232. Accordingly, by actuation of the pull cable 242, the shift fork 244 is pulled in a rightward direction, as illustrated in FIG. 17, so as to oppose the biasing force of the springs 64 so that the piston 232 is moved out of engagement with the face teeth 236 of the hub 12. It should be understood that the pull cable 242 can be connected to various mechanical devices that given an operator a mechanical advantage for overcoming the spring force of the springs 64 to disengage the piston brake 232.

With reference to FIG. 19, an alternative embodiment is shown utilizing an electro-mechanical actuator for disengaging the piston brake. In particular, as shown in FIG. 19, a motor 10 includes a drive shaft 24 that is connected to a hub 12. The piston 232 includes face teeth 234 which engage correspondence face teeth 236 provided on the hub 12. Again, there are a plurality of guide pins which engage apertures in the piston 232 for guiding the piston 232 in an axial direction. A plurality of springs 64 bias the piston 232 in a leftward direction as illustrated in FIG. 19. An electro-mechanical actuation device 200 is provided for disengaging the piston brake. The electro-mechanical actuation device 200 includes an armature 202 connected to a shift fork 204 that engages the piston 232. A coil 206 is provided within a core 208 and when supplied with a current, causes the armature 202 to move in a rightward direction as illustrated in FIG. 19, thus, causing the piston 232 to move out of engagement with the face teeth 236 of the hub 12. Therefore, the hub 12 is free to rotate along with the drive shaft 24. Upon removing the current supply to the coil 206, the springs 64 bias the face teeth 234 of the piston 232 back into engagement with the face teeth 236 of the hub 12.

Figure 22:
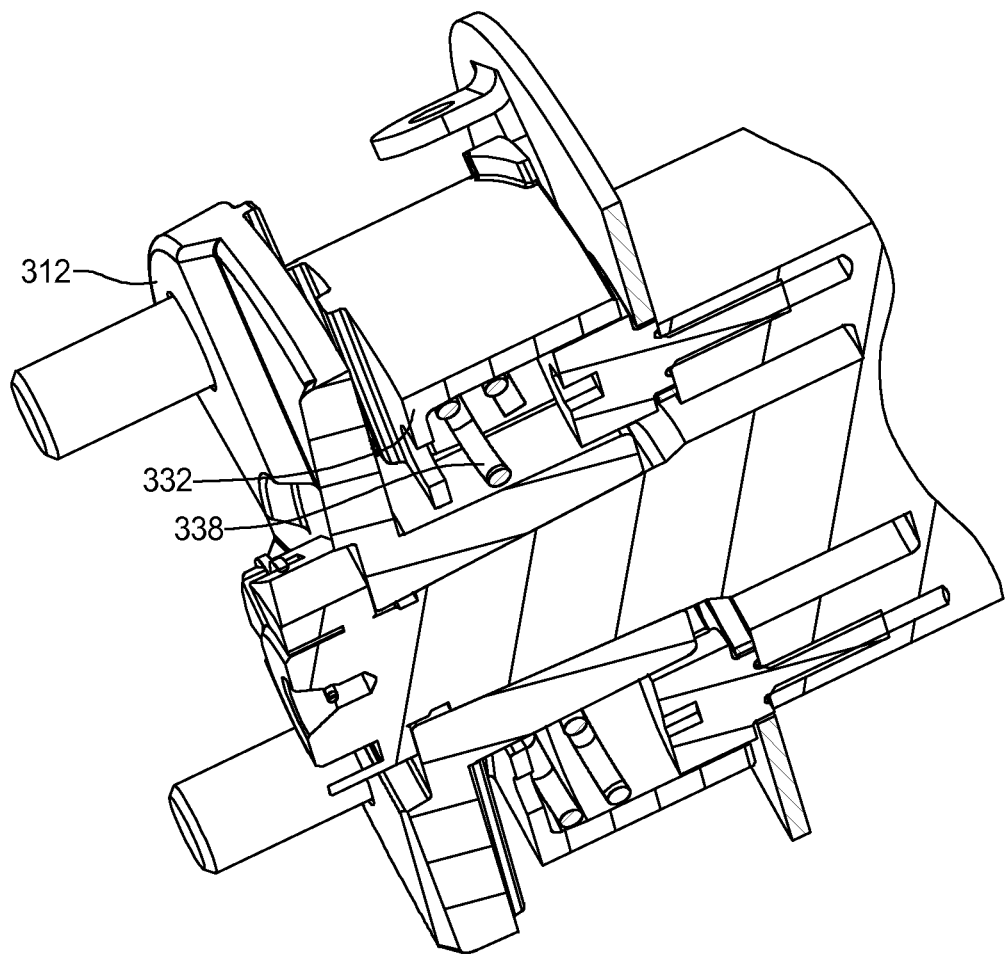
FIG. 22 is a partial cross-sectional view illustrating the components of the parking brake assembly according to the principles of the present disclosure.

With reference to FIGS. 20-22, a motor and piston brake assembly is shown in which a cam actuator is utilized for disengaging the piston brake. In particular, as shown in FIG. 20, a motor 10 includes a drive shaft 24 which is connected to a hub 312 by a nut 26 in the same manner as previously described. A piston 332 is provided with face teeth 334 (FIG. 21) which engage corresponding face teeth 336 on the hub 312. The piston 332 is axially biased into braking engagement with the hub 312 by springs 338 as best shown in FIG. 22. The piston 332 includes a plurality of cam surfaces 340 spaced circumferentially around the piston 332. A plurality of cam members 342 are mounted to an actuator ring 344 for moving the cam members 342 between engaged and disengaged positions with the cam surface 340.

By slight rotation movement of the actuator ring 344, the cam members 342 can be caused to ride up the cam surfaces 340 to cause axial movement of the piston 332 out of braking engagement with the hub 312. By returning the actuator ring 344 to a disengaged position, the cam members 342 ride downward along the cam surfaces 340 so that the biasing force of the spring 338 bias the piston 332 into braking engagement with the hub 312. The slight rotational movement of the actuator ring 344 allows engagement and disengagement of the brake during and after operation of the motor 10. Operation of the actuator ring 344 can be performed by mechanical, electromechanical, hydraulic, or other known operating techniques.

It is noted that the brake mechanism shown in the embodiment of FIGS. 20-22 is a normally applied braking system wherein the piston 332 is normally braked against the hub 312. In order to disengage the brake, the actuator ring 344 is driven to cause the cam members 342 to move up the cam surfaces 340 to draw the teeth 334 of the piston 332 away from engagement with the teeth 336 on the hub 312.

Figure 23:
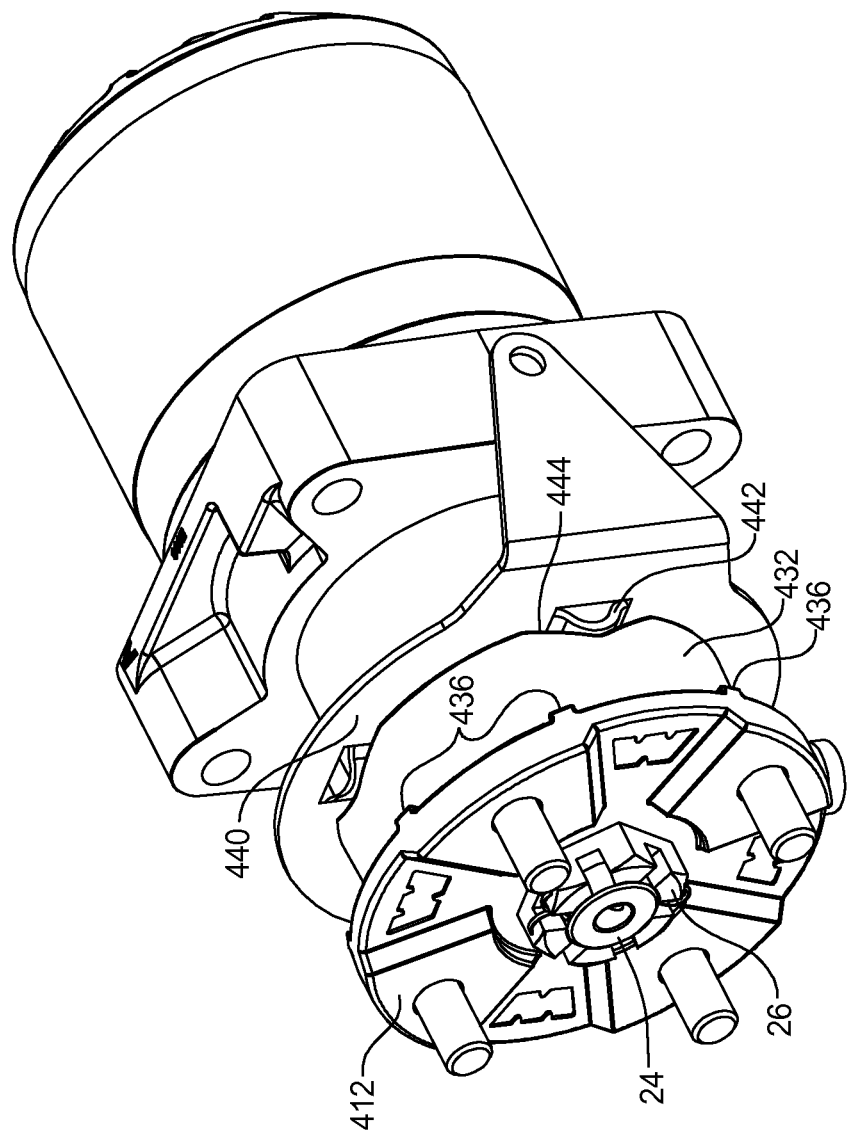
FIG. 23 is a perspective view of an alternative hydraulic motor and wheel hub arrangement incorporating a parking brake, according to the principles of the present disclosure.
Figure 24:
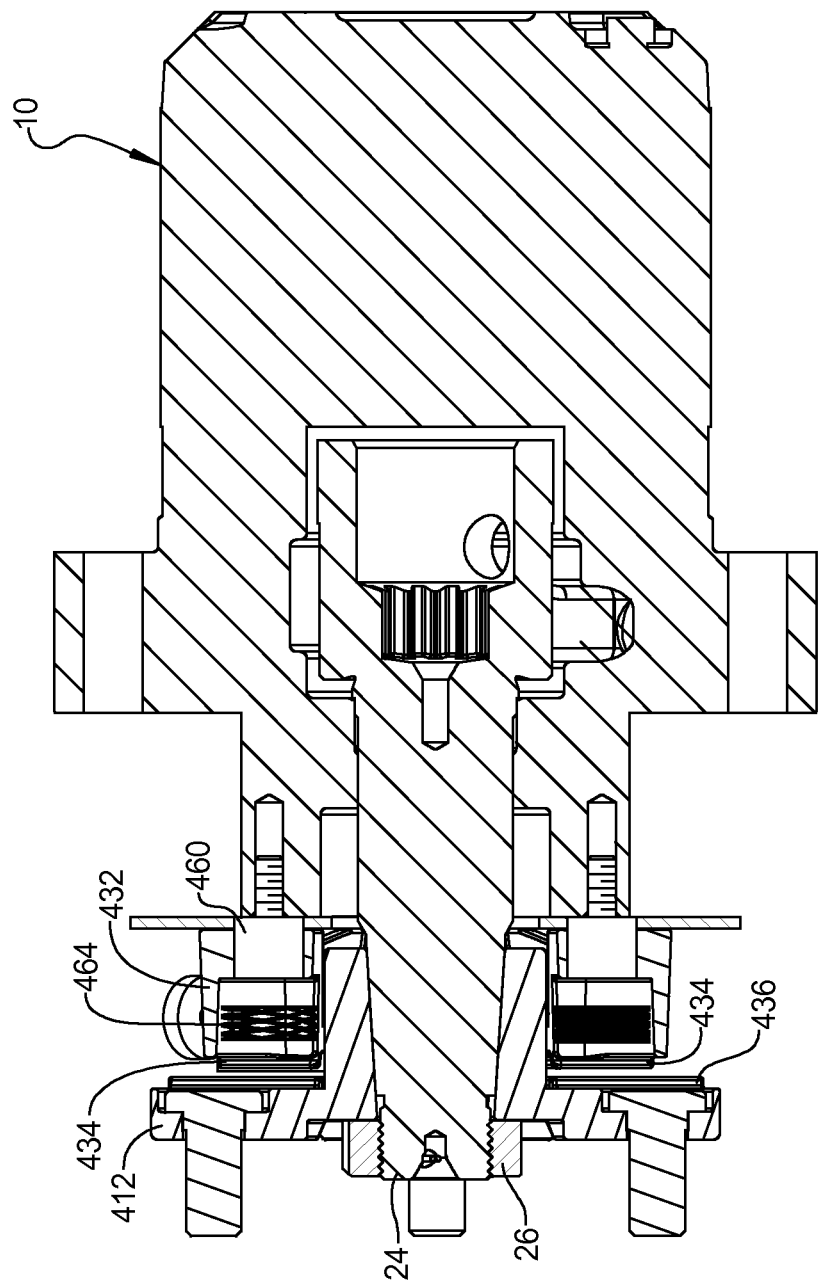
FIG. 24 is a cross-sectional view of the hydraulic motor and wheel hub parking brake system shown in FIG. 23.
Figure 25:
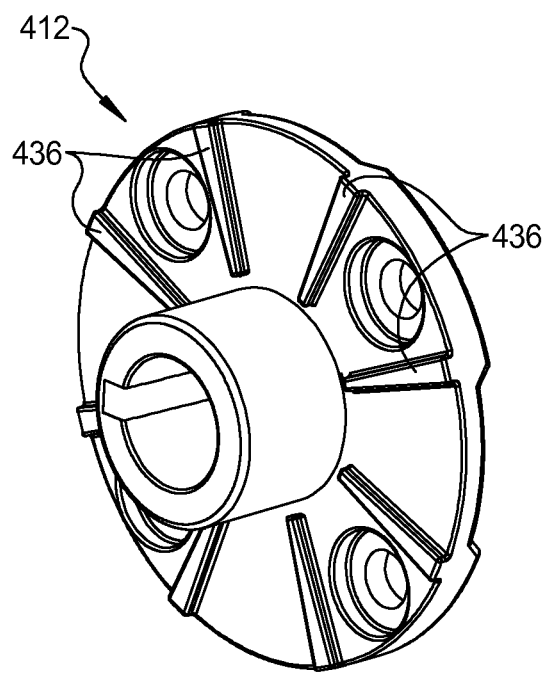
FIG. 25 is a perspective view of a hub of FIG. 24 having face teeth thereon according to the principles of the present disclosure.
Figure 26:
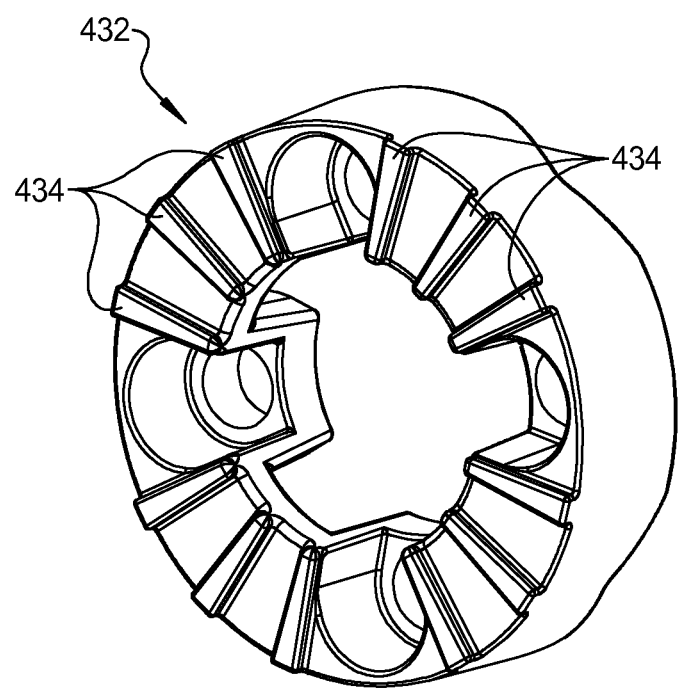
FIG. 26 is a perspective view of the piston of FIG. 24 having face teeth thereon according to the principles of the present disclosure.

According to an alternative embodiment, as illustrated in FIGS. 23-26, a cam actuated system is provided in which the brake is normally in an unapplied condition, and the brake can be actuated to be engaged by the cam system. In particular, as shown in FIG. 23, a motor 10 includes a driveshaft 24 which is connected to a hub 412 by a nut 26 in the same manner as previously described. A piston 432 is provided with face teeth 434 which engage corresponding face teeth 436 on the hub 412. A plurality of guide pins 460 engage and guide the piston 432 while a plurality of springs 464 (FIG. 24) bias the piston 432 out of engagement with the teeth of the hub 412. A cam actuator plate 440 includes a plurality of cam surfaces 442 which engage a rear surface of the piston 432. The rear surface of the piston 432 includes a cam surface 444 which opposes the cam surfaces 442 of the actuator 440. For causing engagement of the brake, the actuator 440 is rotated to cause the cam surfaces 442 to ride upward along the cam surfaces 444 on the rearward surface of the piston 432 to cause axial movement of the piston 432 into braking engagement with the brake teeth 436 on the hub 412. When the actuator 440 is rotated so that the cam surfaces 442 ride downward along the cam surfaces 444 of the piston 432, the springs 464 cause the piston 432 to disengage the brake teeth 436 on the hub 412. The piston 432 is non-rotatably mounted to the motor housing by the guide pins 460, and therefore, provide a braking force when engaged with the brake teeth 436 of the hub 412.

Figure 27:
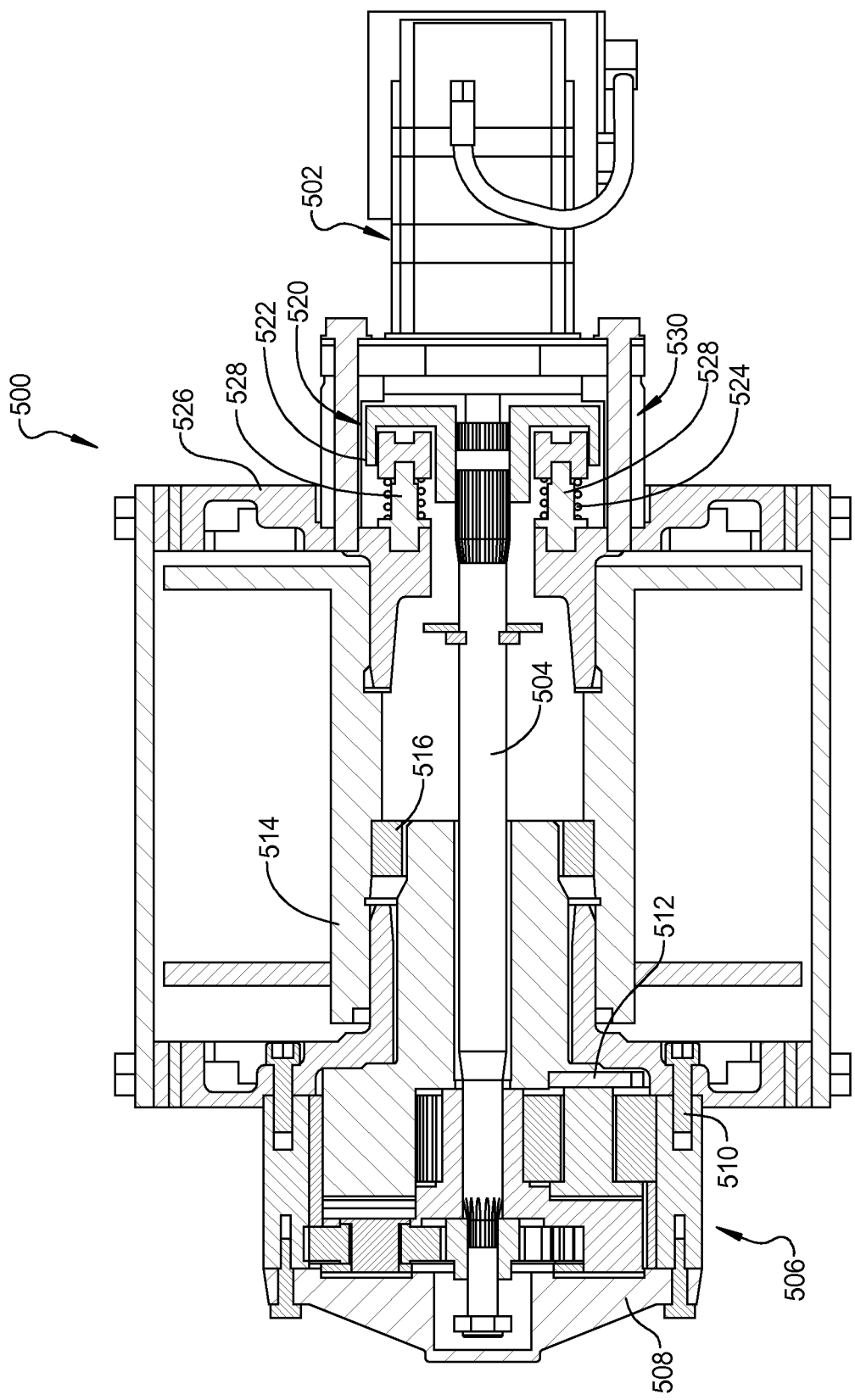
FIG. 27 is a cross-sectional view of a winch incorporating a hub brake according to the principles of the present disclosure.

With reference to FIG. 27, a winch 500 is shown incorporating a hub brake according to the principles of the present disclosure. The winch 500 includes a motor 502 which provides driving torque to a drive shaft 504. The drive shaft 504 is connected to a gear box 506 which can include one or more planetary gear stages. In the embodiment shown, first and second planetary gear stages 508, 510 are illustrated. The function and operation of the planetary gear stages 508, 510 are generally well known in the art. The planetary carrier 512 of the second planetary gear stage 510 provides a splined connection to the drum 514 at spline connection 516.

Upon normal operation, the motor 502 drives the drive shaft 504 which provides input torque to the gear box 506 and the drum 514 is driven by the output spline connection 516 of the gear box 506. According to the principles of the present disclosure, a hub 520 is mounted to the drive shaft 504. The hub 520 includes face teeth disposed within a piston chamber in the same manner as described previously. A piston 522 is disposed within the piston chamber and includes face teeth which engage the face teeth within the hub 520. A plurality of guide pins 524 are mounted to a drum support 526 and guidingly engage the piston 522 for axial movement while preventing rotational movement of the piston 522. A plurality of springs 528 bias the piston 522 in the direction for engagement with the face teeth of the hub 520. A brake housing or cover 530 can be provided for mounting the motor 502 to the drum support 526.

The motor 502 can be a hydraulic motor or an electric motor. The piston 522 can be engaged by an actuation device that can include a hydraulic, mechanical, pneumatic, or electro-mechanical actuation device for disengaging the piston 522 from the face teeth of the hub 520.

Figure 28:
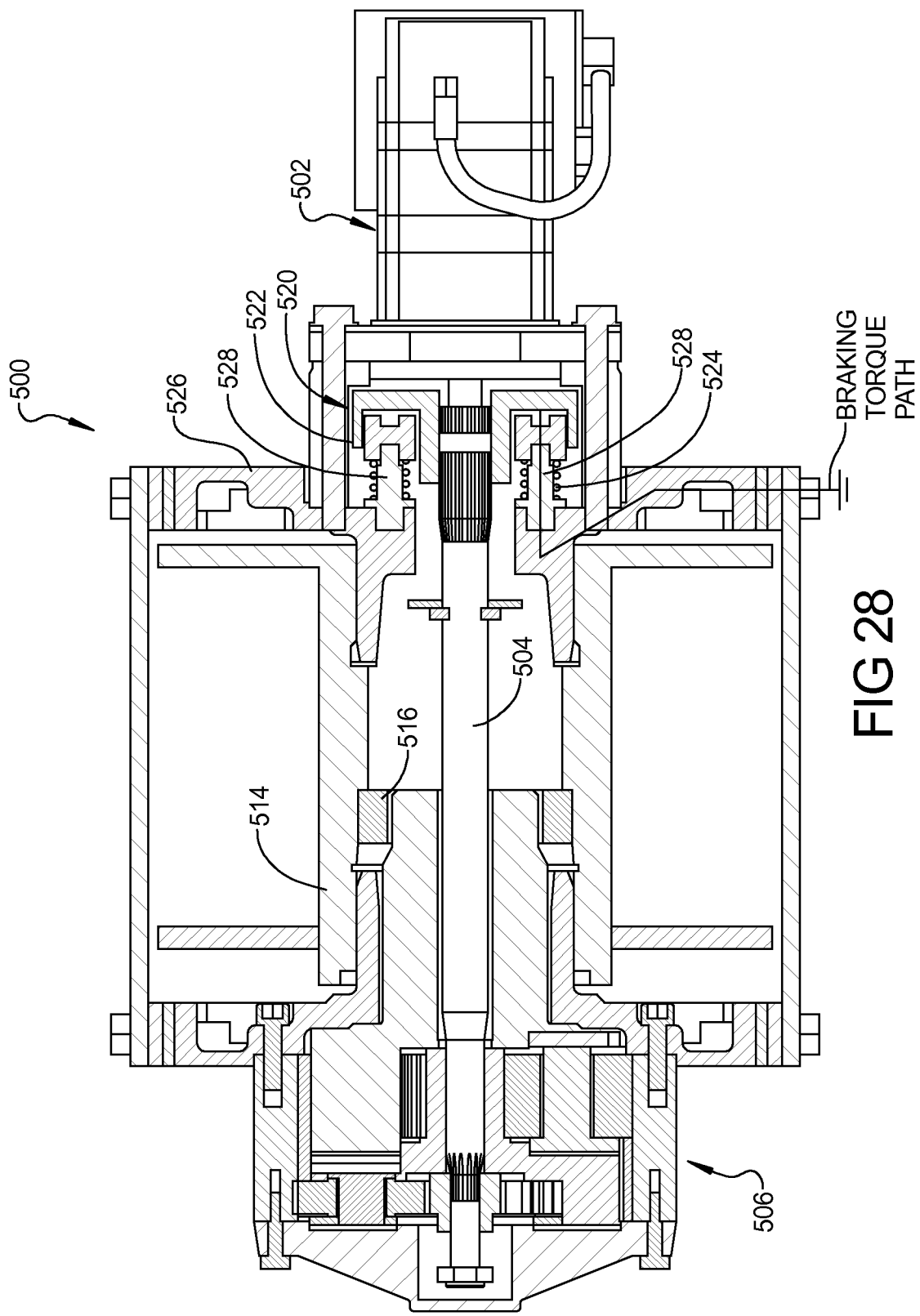
FIG. 28 is a cross-sectional view of the winch shown in FIG. 27 with the drum grounding path being shown.

With reference to FIG. 28, when the face teeth of the piston 522 are engaged with the face teeth of the hub 520, the piston 522 prevents the hub 520 from rotating, thus providing a brake for the winch drum 514. The piston 522 is non-rotatable relative to the drum support 526 and the drum support 526 is mounted to an exterior structure to prevent rotation of the drum support. Thus, while the hub 520 is effectively braked, the drive shaft 504 and drum 514 are also braked. Upon actuation of the motor 502, the piston 522 can be disengaged from the hub 520 to allow the drive shaft and hub to freely rotate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A brake assembly, comprising:
a motor including a drive shaft rotatable about an axis;
a hub drivable via the drive shaft about the axis and attached to the drive shaft through a center aperture of the hub, a surface of the hub including a first plurality of teeth;
a piston non-rotatably secured to a housing of the motor and having a second plurality of teeth that, in a braking mode, engage the first plurality of teeth, where the piston is adapted to move axially along the axis;

a spring for biasing the piston axially away from the surface of the hub for causing disengagement of the second plurality of teeth with the first plurality of teeth; and an actuator adapted to rotate about the axis for moving the piston axially along the axis toward the surface of the hub to engage the second plurality of teeth with the first plurality of teeth.

2. The brake assembly according to claim 1, wherein the actuator is an actuator ring including a cam follower with a cam surface that engages a cam profile on a rear surface of the piston that upon rotation of the actuator ring the cam surface of the actuator ring rides upward along the cam profile and moves the piston axially toward the surface of the hub to engage the second plurality of teeth with the first plurality of teeth, where the rear surface is a first axially facing surface and the piston includes a second axially facing surface, the second axially facing surface including the second plurality of teeth.

3. The brake assembly according to claim 1, further comprising a wheel mounted to the hub via a plurality of wheel lugs of the hub.

4. The brake assembly according to claim 1, wherein the piston is axially supported by a plurality of guide pins extending generally parallel to the axis, where the plurality of guide pins are secured to the housing of the motor.

5. The brake assembly according to claim 4, wherein the spring includes a plurality of springs each supported on one of the plurality of guide pins and engaging the piston.

6. The brake assembly according to claim 1, wherein the first plurality of teeth of the hub extend radially outward from the center aperture, along the surface, and the surface faces in a direction axially parallel to the drive shaft of the motor.

7. The brake assembly according to claim 1, wherein the piston is positioned between the housing of the motor and the hub and wherein the actuator is positioned between the piston and the housing of the motor.

8. A brake assembly, comprising:

a motor including a drive shaft rotatable about an axis;

a hub drivable via the drive shaft about the axis and including a center aperture that receives the drive shaft, a surface of the hub including a first plurality of teeth, the hub rotatable via the drive shaft;

a piston non-rotatably secured to the motor by a plurality of guide pins and axially moveable along the axis toward and away from the hub, the piston having a second plurality of teeth that, in a braking mode, engage the first plurality of teeth, where the piston is positioned between a housing of the motor and the hub;

a spring for biasing the piston axially away from the surface of the hub for causing disengagement of the second plurality of teeth with the first plurality of teeth; and an actuator ring including a first cam surface that engages an opposing, second cam surface on the piston that upon rotation of the actuator ring around the axis is adapted to move the piston axially along the axis toward the surface of the hub to engage the second plurality of teeth with the first plurality of teeth, where the actuator ring is positioned between the piston and the housing of the motor.

9. The brake assembly according to claim 8, further comprising a wheel mounted to the hub.

10. The brake assembly according to claim 8, wherein the piston is axially supported by the plurality of guide pins extending generally parallel to the axis, the plurality of guide pins secured to the housing of the motor.

11. The brake assembly according to claim 8, wherein the spring includes a plurality of springs each supported on one of the plurality of guide pins and engaging the piston.

12. The brake assembly according to claim 8, wherein the first plurality of teeth of the hub extend radially outward from the center aperture, along the surface, and the surface faces in a direction axially parallel to the drive shaft of the motor.

* * * * *